May 20, 1924.
J. F. ROWLEY
ARTIFICIAL FOOT
Filed June 21, 1923
1,494,633
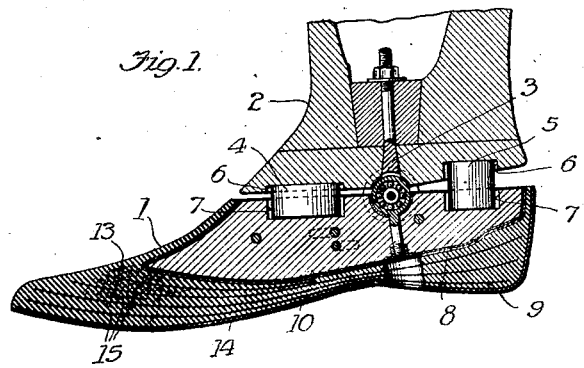
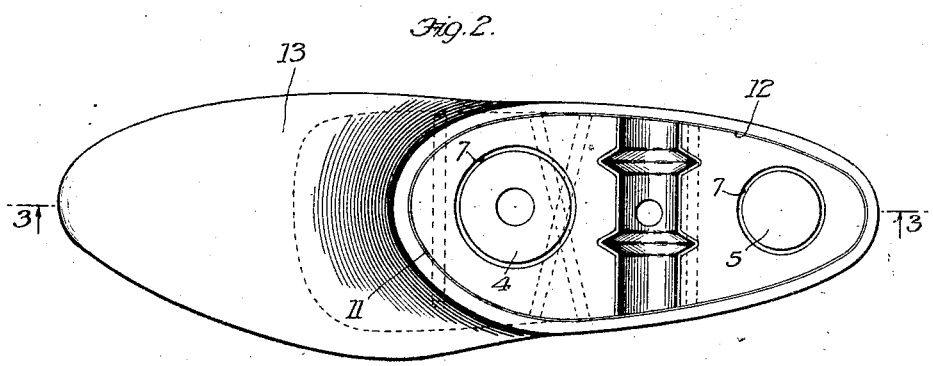
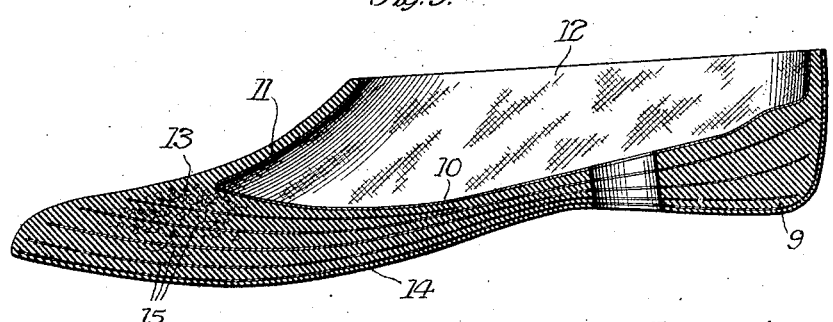
Witness
Martin H. Olsen
Inventor
James F. Rowley
By Rummler & Rummler
Atty's

Patented May 20, 1924.

1,494,633

UNITED STATES PATENT OFFICE.

JAMES FRANCIS ROWLEY, OF CHICAGO, ILLINOIS.

ARTIFICIAL FOOT.

Application filed June 21, 1923. Serial No. 646,792.

*To all whom it may concern:*

Be it known that I, JAMES F. ROWLEY, a citizen of the United States of America, and a resident of Chicago, county of Cook, and State of Illinois, have invented a new and useful Improvement in Artificial Feet, of which the following is a specification.

This invention relates to the manufacture of rubber feet having wooden cores, the rubber serving to give the foot its exterior form and flexibility where required, while the core is used in forming a connection with the artificial leg and functions to localize the action when the foot is in use, or in other words, to obtain or to permit movement as required in walking.

The object of this invention is twofold. First to provide a wooden core for a rubber foot in which the wood retains its natural vitality; in other words escape carbonization from the extreme heat required in vulcanizing the rubber and at the same time to add to the natural strength of the wood by cementing a rawhide cover thereto. Second, to so construct a rubber envelope having a recess to receive the rawhided wooden core and such a lining covering the inner surfaces of the recess as might readily be glued or cemented to the rawhided core and which may be forcibly removed therefrom without injury either to the envelope or the core, thus permitting repair of the core or revulcanization of the envelope, thus avoiding the necessity of a new foot when either the core or the envelope seriously needs repair. Heretofore in the manufacture of rubber feet a wooden core was invariably employed as a foundation, the rubber being built thereon and in the process of vulcanizing the core and rubber went into the mold together. As a result of the process of vulcanization the rubber was solidly vulcanized to the surfaces of the core and the core was charred or carbonized more or less by the intense heat required to cure or vulcanize the rubber. The advantages of a wooden core having full vitality not subject to any heat whatever and having a rawhide covering cemented to it are apparent, the rawhide adding possibly 500 to 600 per cent to the durability of the core.

From the foregoing it may be seen that, the purpose of the present invention is to increase the life of a rubber foot by making possible the use therein of a rawhided core. It is also the purpose of the invention to provide a rubber foot which is separable from the core in order that the foot may be revulcanized or repaired quickly, thus avoiding the necessity of purchasing a new foot when the rubber part only should be repaired or replaced. The present invention also avoids the necessity of subjecting the wood core of the foot to vulcanizing temperatures, which operation results in decreasing the life of the wood by rendering the core friable and easily split or broken.

The objects of the invention are accomplished by a construction as shown in the accompanying drawings wherein:

Figure 1 is a longitudinal, sectional view of a foot constructed according to this invention, and shows its connection with the shin section of the leg.

Figure 2 is a plan view of the foot.

Figure 3 is a longitudinal, sectional detail of the rubber part of the foot.

The chief feature of the present invention is a sponge rubber envelope separable from its wooden core and for this reason this rubber envelope is molded to provide a core receiving recess, this recess being lined with canvas and the core also having a preserving surface such as rawhide. The rawhide and canvas are glued or cemented together, but the rubber envelope may be stripped from the core along this glued surface without injury to either the envelope or the core, due to the strength of the canvas lining in the rubber envelope and the rawhide surface of the core.

The foot 1 is connected as usual to the shin part 2 of an artificial leg by a bearing element 3 to provide for the required ankle movement as limited by cushions 4 and 5 seated in recesses 6 and 7. The wooden cores 8 and the rubber envelopes 9 forming the foot are made in interfitting standard sizes. The core is preferably covered by a rawhide coating 10 mainly to strengthen it and prevent access of moisture to the core. The envelope is formed of canvas and sponge rubber and is molded and vulcanized in metallic molds. The canvas or fabric employed for the lining 11 of the core receiving recess 12 of the rubber envelope is preferably made of strong, high grade canvas such as tire liner having a rubberized surface on one side so as to be readily vulcanized to the sponge rubber body 13 of the rubber envelope. This rubber envelope has a rubberized fabric tread 14 known as breaker strip and which also forms the reinforcing strips 15.

In assembling the two parts of the foot, the rawhided core is cemented or glued to the canvas lining of the core receiving recess of the envelope. If necessary the two parts of the foot may be separated along the cemented surface by means of a screw driver or other tool suitable for working the two parts of the foot apart.

From the foregoing it may be seen that the rubber envelope has an interior lining for the recess, one side of which is rubberized and vulcanized into the foot and the other presents a surface to which the rawhided core may be glued or cemented, making the two parts of the foot integral, and making it possible to force the lining of the recess from the rawhided surface of the core, and enabling either the manufacturer or user to repair or replace the rubber envelope, or the core, for that matter, when either becomes worn or broken. The core of the foot not having been through the vulcanizing process retains its full vitality, and may also have the rawhide covering firmly cemented thereto, thus practically making an end to the friability or splitting of the core in rubber feet.

I am aware of the construction shown in patent to Marks, No. 470,431, of March 8, 1892, showing a core with an aluminum shell and a removable rubber envelope, and also of Marks Patent No. 234,596 of November 16, 1880, showing a rubber envelope having canvas reinforcing strips, and patent to Staggs, No. 772,753 of October 18, 1904, showing a core covered with rawhide surrounded by a layer of felt and covered with a layer of canvas and rubber, and I do not claim the construction shown in either of said patents.

I claim:

1. An artificial foot of the class described comprising a wooden core having a rawhide covering, and a detachable rubber envelope having the exterior form of a foot and provided with a recess within which the core is detachably cemented, said rubber envelope having a fabric lining which is integral therewith along the surfaces of the recess to allow for removal of the rubber envelope without injury to the latter.

2. An artificial foot of the class described comprising a core of wood or the like having a protecting covering of rawhide or the like, and a detachable envelope of rubber or the like hving the exterior form of a foot and provided with a recess having fixed therein and embedded in the rubber a lining of canvas or the like, in which said core is seated and so detachably cemented to said lining as to allow for separation of the core from the envelope without injury to either.

3. An artificial foot comprising a core of wood or the like having a protective covering of rawhide or the like, said core having been formed and maintained free from such temperature conditions as are required to vulcanize rubber, an envelope of rubber or the like having the exterior form of a foot and being provided with a recess lined with canvas or the like and detachably fitting said core, said canvas having the rubber vulcanized into fixed engagement therewith in the absence of the core, and said envelope being afterwards detachably secured to the core by cementing said lining to said protective covering.

4. An artificial foot comprising a core which has been formed and maintained free from such temperature conditions as are required to vulcanize rubber, an envelope of rubber or the like having the exterior form of a foot and being provided with a recess lined with canvas or the like and detachably fitting said core, said canvas having the rubber vulcanized into fixed engagement therewith in the absence of the core, and said envelope being afterwards detachably secured to the core by cementing said lining to said core.

5. An artificial foot comprising a core which has been formed and maintained free from such temperature conditions as are required to vulcanize rubber, an envelope of rubber or the like having the exterior form of a foot and being provided with a recess lined with canvas or the like and detachably fitting said core, said envelope having had the rubber part vulcanized in the absence of the core, and said envelope and core when assembled having said lining so cemented to the rubber and to said core as to permit separation of the envelope from the core without injury to either.

Signed at Chicago this 18th day of June, 1923.

JAMES FRANCIS ROWLEY.